Patented Nov. 27, 1945

2,390,036

UNITED STATES PATENT OFFICE 2,390,036

VULCANIZATION WITH DIARYL GUANIDINE ADDITION PRODUCTS

Arnold R. Davis, Riverside, Conn., assignor to American Cyanamid Company, New York, N. Y., a corporation of Maine No Drawing. Application August 7, 1944, Serial No. 548,498

16 Claims. (Cl. 260—789)

This invention relates to a new vulcanization process adapted for use in both natural and synthetic rubbers. More particularly, the invention relates to the vulcanization of natural and synthetic rubber, making use of a new type of accelerator which constitutes the reaction product of a diaryl guanidine and a zinc salt of a mercaptan or a dithiocarbamic acid. The present invention relates to rubber compositions containing the accelerators and to the process of vulcanizing therewith. The products which constitute the accelerators are claimed, per se, in my copending application for United States Letters Patent Serial No. 548,497, filed of even date.

The accelerators used according to the present invention are chemical compounds of definite composition which may be designated by the formula $A_xZn(B)_2$. In the formula, A represents a diaryl guanidine, such as diphenyl guanidine, di-o-tolyl guanidine, (particularly the diorthotolyl guanidine), the dixylyl guanidines, diphenyl guanidine, and the like. In the process of the present invention $x$ represents the integers one and two. The group designated by B may be quite widely varied since $Zn(B)_2$ represents salts of both mercaptans and dithiocarbamic acids. In this group are such compounds as the zinc salts of: mercaptobenzothiazole, dialkyl dithiocarbamic acid such as the dimethyl, diethyl, dibutyl and bis-alkoxyalkyl dithiocarbamic acids, the alkyl, aryl dithiocarbamic acids such as N,N-propyl, phenyl and N,N-butyl, phenyl dithiocarbamic acids, and the like.

The proportions in which the diaryl guanidines and the zinc salts are combined may be quite widely varied. However, for the purposes of the present invention only those compounds in which $x$ has a value of from one to two are of particular importance. The method of preparing the accelerator may be either by heating together the fused reactants until reaction is complete or by carrying out the reaction in a volatile solvent, suspension or solution under gentle heating. The accelerators may be either amorphous or crystalline, many of them appearing as clear resins and others as clear white crystals. In whatever form the product is obtained it has a fixed analysis, and, in the case of the crystalline materials, a definite melting point indicating that a true chemical compound is formed by the reaction and not simply a complex mixture.

The accelerators of the present invention, as has been pointed out, are relatively useful with natural rubbers and with such synthetic rubbers as Butyl rubber, and polymers of the butadiene-styrene and butadiene-acrylic type such as Buna "S" and Buna "N." They may be used alone or in conjunction with other accelerators, activators, retarders, and the like depending on the materials to be treated and the nature of the product to be produced. The accelerators may be used in conjunction with known types of rubber compositions which may and ordinarily will contain such other materials as sulfur, stearic acid, salts thereof, fillers, reenforcing agents, and the like. The use of these latter, however, are conventional, and form no part of the present invention.

The following examples show the preparation of the accelerators and their use according to the present invention. The examples are intended to be illustrative only and not by way of limitation. All parts are by weight unless otherwise noted. In these examples, the following abbreviations are used for the sake of simplification:

D. P. G.—diphenyl guanidine.
D. O. T. G.—di-o-tolyl guanidine.
D. X. G.—dixylyl guanidine.
M. B. T.—mercaptobenzothiazole.
D. T. C.—dithiocarbamic acid.

EXAMPLE 1

(D. P. G.)$_2$Zn(M. B. T.)$_2$ 199 parts of the zinc salt of mercaptobenzothiazole and 211 parts of diphenyl guanidine were heated together with stirring until they fused at about 110° C. A clear resin formed in a few minutes. The fusion product was held at 100–110° C. for about 15 minutes after which the melt was cooled, crushed, ground and remelted at about 100° C. A clear resin was formed.

EXAMPLE 2

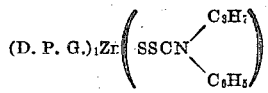

485 parts of zinc N,N-n-propyl, phenyl dithiocarbamate and 211 parts of diphenyl guanidine were fused together and held at 95–100° C. for about 15 minutes A clear liquid formed which, on cooling, gave a clear resin.

EXAMPLE 3

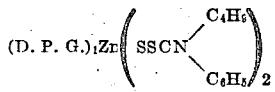

The process of Example 2 was repeated, using 513 parts of zinc N,N-n-butyl, phenyl dithiocarbamate and 211 parts of diphenylguanidine. As in Example 2, a clear liquid was formed which gave a clear film on cooling.

EXAMPLE 4

(D. P. G.)Zn(M. B. T.)$_2$

The procedure of Example 1 was repeated, using 199 parts of the zinc mercaptobenzothiazole and 106 parts of diphenylguanidine. The mass fused at 125–130° C. and after being cooled, crushed, and ground, melted at about 130° C. The product was a light brownish-yellow resin.

EXAMPLE 5

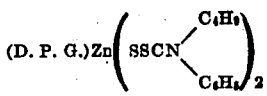

513 parts of zinc butylphenyldithiocarbamate and 211 parts of diphenylguanidine were fused together for about 15 minutes at 95° C. A substantially water-white resin was formed.

EXAMPLE 6

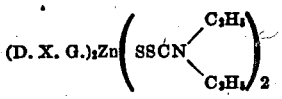

The procedure of Example 5 was repeated using 107 parts of dixylylguanidine and 72.4 parts of zinc diethyldithiocarbamate. After about one-half hour's heating at 100–105° C. a clear, resinous product was obtained.

EXAMPLE 7

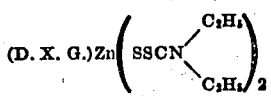

The procedure in Example 6 was repeated using half the quantity of zinc diethyldithiocarbamate. A similar appearing resin was obtained.

EXAMPLE 8

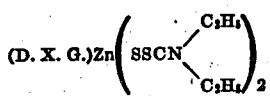

534 parts of dixylyl guanidine were added to a solution of 362 parts of zinc diethyldithiocarbamate in benzene at 30° C. The temperature was raised to 75–78° C. and held for about 40 minutes after which the solution was filtered, the filter washed with hot benzene and the washings added to the original filtrate. The filtrate was rapidly evaporated to about one quarter its original volume and then allowed to stand in air at room temperature. No crystals appeared even after long standing. The product is a soft resin.

EXAMPLE 9

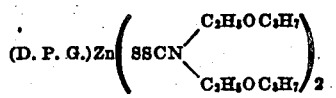

297 parts of zinc bis-ethoxypropyldithiocarbamate were fused together at about 100° C. with 211 parts of diphenyl guanidine, for a sufficient time to form a clear liquid. On cooling a thick light colored paste was formed indicating crystalline growth.

EXAMPLE 10

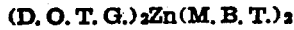

(D. O. T. G.)$_2$Zn(M. B. T.)$_2$ 119 parts of zinc mercaptobenzothiazole and 143 parts of di-o-tolyl guanidine were fused together at 125° C. to give a clear melt which was cooled, crushed and ground and again heated at 125° C. for about 15 minutes, after which the fusion product was allowed to stand overnight. Optically, the product shows crystals differing from either di-o-tolyl guanidine or zinc mercaptobenzothiazole.

EXAMPLE 11

47.8 parts of di-o-tolyl guanidine were suspended in 500 parts of benzol and 39.8 parts of zinc mercaptobenzothiazole added thereto. Both materials dissolved on heating to about 78–80° C., the temperature being held at this point until about one-half the benzol was evaporated. On standing for about one hour, crystals formed and the mass solidified. About 250 parts of benzol were added to dissolve the crystals, the solution was filtered and cooled, crystals separated out, washed with benzol and dried in air for about 48 hours. The product was a homogeneous crystalline mass melting at 151–153° C. and having a nitrogen content of 12.30% and a sulfur content of 13.81%.

EXAMPLE 12

The same amounts of material used in Example 11 were fused together at 170° C. and heated at 153–155° C. until the melt was clear. A glassy amorphous product was obtained.

EXAMPLE 13

Example 11 was repeated using 51.3 parts of zinc N-propyl, phenyl dithiocarbamate and 42.2 parts of diphenyl guanidine. After 30 minutes of heating, the solution allowed crystals of the product to form when cooled.

EXAMPLE 14

Example 11 was repeated using 39.8 parts of zinc mercaptobenzothiazole and 47.8 parts di-o-tolyl guanidine in 500 parts of benzol. A clear solution formed after about one-half hour at 70° C. Heating was continued for one hour, followed by filtration. On cooling, no crystals formed. About one-half the solvent was then evaporated. The crystals formed after evaporating part of the solvent were redissolved in benzol and recrystallized. The resultant crystals formed were washed twice in benzol and dried at 100° C. for about one hour. The crystalline product had a melting point of 155–157° C. and the following analysis:

| | | |
|---|---|---|
| N _____per cent__ | 12.74 | 12.78 |
| S _____per cent__ | 14.40 | 14.60 |
| Zn _____per cent__ | 7.26 | 7.44 |

A second batch of crystals recovered from the mother liquor had the same melting point indicating that a uniform product was obtained.

EXAMPLE 15

A portion of zinc mercaptobenzothiazole was washed in hexane, benzol and acetone. 119.3 parts of washed salt was fused with 143.5 parts of di-o-tolyl guanidine at 125–140° C. After fusion the mass was cooled, ground and remelted, the temperature being held at 157° C. until reaction appeared to be complete, as evidenced by the clarity of the melt.

EXAMPLE 16

Vulcanization in butyl rubber

The product of Example 3 (D. P. G.)Zn(N,N-n-butyl,phenyl D. T. C.) was made into the following composition by milling the components together:

| | |
|---|---|
| Butyl B_____ 106.5 (contains 5% ZnO, 1.5% Sul.) | |
| Stearic acid_____ | 3 |
| Pelletex black_____ | 40 |
| E. R. C. black_____ | 10 |
| Accelerator_____ | 1.0 |

After curing for 60 minutes at 153° C. the product was found to be a Shore Hardness of 44.

Example 17

Vulcanization of Buna S

The same accelerator produced in Example 3 was made up into the following compositions:

| | |
|---|---:|
| Buna S | 100 |
| Coal tar softener | 5 |
| Zinc oxide | 5 |
| E. P. C. black | 50 |
| Sulfur | 2 |
| Above accelerator | 0.65 |

| Cure | | Modulus at 300% | Tensile strength | Percent elong. |
|---|---|---|---|---|
| Time, minutes | Temp., °C. | | | |
| 15 | 141 | 490 | 1,945 | 710 |
| 30 | 141 | 985 | 3,090 | 605 |
| 60 | 141 | 1,295 | 2,750 | 490 |

Example 18

Effect of varying proportions of diaryl guanidine on vulcanization

In order to show the distinction between the use of diaryl guanidine in the ratio of 1 and 2 parts of diaryl guanidine per part of zinc salt, the following compositions were prepared and tested and the results shown in the table were obtained.

| | Compounds | |
|---|---:|---:|
| G. R.-S | 100 | 100 |
| Bardol (coal tar softener) | 5 | 5 |
| Zinc oxide | 5 | 5 |
| E. P. C. black | 50 | 50 |
| Sulfur | 2 | 2 |
| (D. P. G.)₂ Zn (M. B. T.)₂ (from Example 1) | .89 | — |
| (D. P. G.) Zn (M. B. T.)₂ (from Example 4) | | .90 |
| 60' cure at 141° C. | | |
| Shore hardness | 60 | 61 |
| Mod. at 300% | 1070 | 755 |
| Tensile | 2610 | 2285 |
| Elongation | 535 | 590 |
| Tortional hysteresis "K" at 280° F | .180 | .184 |

Example 19

Comparison of solvent vs. fusion products

In order to show that substantially the same results are obtained whether the products of the present invention are prepared by fusion or by the solvent process, the compositions shown in the following table were prepared and tested. It will be noted that substantially equivalent results were obtained.

| | Compounds | |
|---|---:|---:|
| G. R.-S | 100 | 100 |
| Bardol (coal tar softener) | 5 | 5 |
| Zinc oxide | 5 | 5 |
| E. P. C. black | 50 | 50 |
| Sulfur | 2 | 2 |
| (D. O. T. G.)₂ Zn (M. B. T.)₂ (Example 14) | 0.90 | |
| (D. O. T. G.)₂ Zn (M. B. T.)₂ (Example 15) | | 0.90 |
| Cured 55 minutes at 141° C. | | |
| Shore hard. (30") | 61 | 59 |
| Mod. at 300% | 1150 | 1100 |
| Tensile | 3050 | 2950 |
| Elongation, per cent | 580 | 600 |
| Set at break., per cent | 26 | 26 |
| Tortional hysteresis "K" at 280° F | .168 | .174 |
| DeMattra cut growth rate mils/KC | 33 | 27 |

I claim:

1. As a new composition, a product obtained by milling together an unvulcanized vulcanizable rubber and an accelerator represented by the Formula $A_xZn(B)_2$ in which A represents a diaryl guanidine, $x$ represents the integers one and two and B represents a member of the group consisting of the

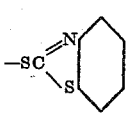 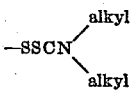 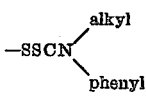

and

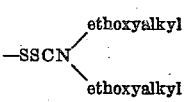

radicals.

2. A composition according to claim 1 in which A is diphenyl guanidine.
3. A composition according to claim 1 in which A is di-o-tolyl guanidine.
4. A composition according to claim 1 in which A is a dixylyl guanidine.
5. A process of vulcanizing natural and synthetic rubbers which comprises the steps of milling together a mixture comprising unvulcanized vulcanizable rubber and an accelerator $A_xZn(B)_2$ in which A represents a diaryl guanidine, $x$ represents the integers and 1 and 2 and B represents a member of the group consisting of the

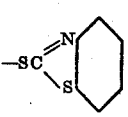 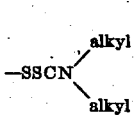 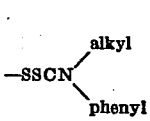

and

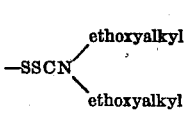

radicals, and subjecting the mixture to heat for a sufficient length of time to establish the cure of the rubber.

6. A process according to claim 4 in which A is diphenyl guanidine.
7. A process according to claim 4 in which A is diorthotolyl guanidine.
8. A process according to claim 4 in which A diaryl guanidine is dixylyl guanidine.
9. As a new composition, a product obtained by milling together an unvulcanized vulcanizable rubber and an accelerator represented by the formula

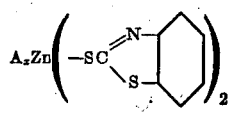

in which A represents a diaryl guanidine and $x$ represents the integers 1 and 2.

10. A composition according to claim 9 in which A is diaryl guanidine.
11. A composition according to claim 9 in which A is di-o-tolyl guanidine.
12. A composition according to claim 9 in which A is a di-xylyl guanidine.
13. A process of vulcanizing natural and synthetic rubbers which comprises the steps of milling together an unvulcanized vulcanizable rubber and an accelerator represented by the formula

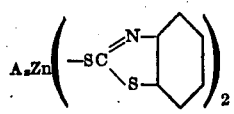

in which A represents a diaryl guanidine and $x$ represents the integers 1 and 2, and subjecting the mixture resultant therefrom to heat for a sufficient length of time to establish the cure of the rubber.

14. A process according to claim 13 in which A is diphenyl guanidine.

15. A process according to claim 13 in which A is di-o-tolyl guanidine.

16. A process according to claim 13 in which A is di-xylyl guanidine.

ARNOLD R. DAVIS.